Patented Jan. 23, 1934

1,944,294

UNITED STATES PATENT OFFICE 1,944,294

COLORED MINERAL PRODUCT AND PROCESS OF MAKING THE SAME

Poole Maynard, Atlanta, Ga.

No Drawing. Application April 26, 1929
Serial No. 358,428

3 Claims. (Cl. 91—70)

This invention relates to the manufacture of colored mineral products and in its preferred embodiment specifically relates to the manufacture of colored granules or particles particularly adapted for use in the preparation of colored roofing material such as fire-proof shingles.

The principal object of this invention is to provide an economical, simple, and efficient process of preparing colored mineral products such as colored granules, bricks, concrete, stucco and the like.

A further object of this invention is to provide colored mineral products of the above referred to character which may be produced more economically than such products are now produced.

A further object of this invention is to provide hard colored particles which are particularly adapted for use in the preparation of colored roofing material such as roofing sheets, fire-proof shingles and the like.

Other objects and advantages of the invention will become apparent during the course of the following description.

It is an old practice to color, naturally occurring minerals such as clay, shale, slate and the like and to color products made from naturally occurring minerals, such as bricks, concrete and similar products. Moreover, numerous processes have been proposed for coloring products of the above referred to character and these processes have been successful in varying degrees. However, it has been found that these processes are disadvantageous for certain purposes. For example, some of the coloring methods heretofore employed have involved applying colored paint to the surface of the materials and this method has been found to be unsuitable where an absolutely fire-proof product was desired. Moreover, this method has not been found to produce the surface effect desired in some arts. Other known methods which have eliminated some of the disadvantages of the painting method have been found to be too expensive for commercial practice. In many cases the products produced have been unsuitable for certain uses because of the detrimental effects of the weather thereon. This has been particularly true in connection with the colored particles or granules used in the preparation of roofing material. Moreover, the manufacture of such particles or granules by the methods most generally employed has been found to be unduly expensive.

It is the principal purpose of this invention to overcome or materially decrease the above referred to disadvantages attending the heretofore employed processes of coloring mineral products. I have discovered that durable colored mineral products of the above described character can be efficiently, simply and economically prepared by the use of my novel process hereinafter set forth in detail.

The process forming the subject matter of this invention may be advantageously employed in coloring any absorptive mineral product. By the term absorptive as used in the specification and claims is meant either a material which has a sufficient degree of porosity as to take up or absorb a liquid material, or products which, although not porous to any substantial degree or absorptive in the strict sense of the word, have such surface characteristics as to mechanically retain on the particle a certain amount of liquid or a sufficient amount of a precipitate resulting from the reaction of two or more reacting materials in the presence of the product as to give to such product the color of the precipitate.

For example, certain particles such as quartzite and hard sand have no substantial degree of porosity and yet as they naturally occur have such surface characteristics as to be absorptive within the meaning of the term as employed herein. Illustrative examples of the materials which may be treated in accordance with this process are, in part, as follows: burned clay particles, burned clay products larger in size than particles, such as bricks, semi-vitrified or vitrified clay or clay-like products, particles or surfaces of concrete, burned fuller's earth or similar earths, burned shale, burned or unburned slate, quartzite, sand crushed marble products, granite and similar stones, and the like, including blast furnace slag.

In its broad aspects, my process comprises impregnating the material to be treated with a chemical or chemicals which is or are adapted to react with another chemical or chemicals later added to form a coloring material or pigment in and/or on the product being treated. The first chemical or chemicals with which the mineral product is treated, I have termed a color intermediate and the chemical or chemicals which is or are subsequently added to effect the precipitation of a color or coloring material in and/or on the mineral product whereby its coloring or change of color is effected, I have termed a color precipitant. Obviously, numerous color intermediates and color precipitants may be employed and several specific examples of such materials are referred to in the illustrative examples which are set forth below. Obviously, any two or more chemicals which will react to form a precipitate capable of serving as a coloring medium may be used in the practice of the process although experience will show that certain chemicals will work to better advantage and produce better and more lasting coloring effects than other chemicals. However, it appears that all compositions of the character referred to will produce some measure of success.

In the preferred practice of my process, wherein particles or mineral products of comparatively small size are treated, I immerse the product to be treated in a solution of a color intermediate in order to impregnate the product with the color intermediate which is necessary for reacting with the color precipitant. In some instances it is advantageous to boil the products in a solution of the color intermediate for maximum impregnation. The excess solution is removed from the product and the product is then treated with the color precipitant. If the color precipitant is used in the form of a solution, the impregnated products are preferably immersed in the solution. If the color precipitant is a gas the impregnated products are placed in an atmosphere of such gas. The products are kept in contact with the color precipitant until the reaction between the color intermediate and the color precipitant is effected in and/or on the products. The thus colored products may be then washed and dried after which they are ready for use as desired. In some cases, as where the mineral product being treated has a low degree of porosity, it is preferable to first dry the colored products and later wash and re-dry the products. Any means for drying may be utilized although drying at a comparatively low temperature is preferred.

When large surfaces of products to be colored are treated, as when coloring concrete walls or the like, the solution of the color intermediate may be sprayed or brushed on to the surface and a solution of a color precipitant similarly applied. Obviously, various apparent modifications in the process will occur to those using the process.

The following specific procedures may be considered as illustrative of the invention:

*Example A.*—Products of a green color may be prepared by treating the product with a boiling aqueous solution of arsenic trioxide, preferably a 3% solution although the percentage of the solution may be varied according to the particular shade or intensity of color desired. The excess of arsenic is preferably removed and the product treated with a boiling solution of copper acetate, preferably a 15% solution although the strength of the solution may be varied. The product is then dried either with or without washing, and in such form is ready for use.

*Example B.*—Products of a pale green or jade green color may be prepared by treating the products with a relatively weak solution of ferro-cyanide, drying the impregnated products and treating the dried products with a solution of ferrous sulfate. The products are then dried and washed.

*Example C.*—In preparing yellow products, the material to be treated is boiled with a slightly acid hydrochloric acid solution of approximately 10% arsenic trioxide, removing the excess of the solution from the product by decantation, drying the product, and exposing it to hydrogen sulphide gas, which gives the product the yellow color of the sulphide of arsenic.

Yellow products may also be prepared by treatment with a solution of lead acetate or lead nitrate, the strength of solution depending upon the desired shade or color, drying the impregnated product and adding a solution of potassium or sodium dichromate. The colored material is then dried.

*Example D.*—In preparing a blue product, the material is preferably treated with a 10% solution of ferric chlorid acidified with hydrochloric acid. The material is preferably allowed to remain in the solution from one-half hour to several hours and the excess solution is then removed from the impregnated product after which the latter is immersed in a 10% solution of potassium ferro-cyanide. The excess liquid is then poured off and the product washed with water and dried.

From the foregoing examples it will be apparent that the color intermediates and color precipitants may be used in various concentrations depending upon the shade of color or intensity of color desired. Moreover, it will be apparent that the time of treatment with the color intermediate and the color precipitant will depend upon the degree of porosity of the material being treated. Similarly, washing and/or drying the product following the impregnation treatment and/or the precipitating treatment may be employed or dispensed with as desired.

The products prepared in accordance with this process have been found to be particularly durable as to color and therefore especially adapted for use in preparing colored roofing materials. For example, colored granules or burned clay or mineral particles may be colored according to this process and applied to a sheet of roofing paper by means of any well-known plastic composition employed for this purpose, and the resulting sheet dried. This produces a colored, substantially fire-proof roofing sheet which may be used in sheet form or cut to produce shingles. Pleasing effects may be secured by variously coloring a sheet or shingle by the use of particles of different color.

A particular advantage of the process described herein is secured when mineral products having a degree of porosity permitting capillarity are employed. When such products are treated in accordance with the invention precipitation of color occurs throughout the material so that the colored products may be ground or otherwise broken up without impairing the color effect. Moreover, when a precipitate is formed throughout the product it is substantially impossible to wash out the precipitate with the result that the colored product is not injured when exposed to conditions of moisture and rain. The advantage of this will be apparent.

I claim:—

1. The process of preparing colored roofing granules which comprises impregating burned clay granules with a solution of an inorganic color intermediate and treating the impregnated granules with a solution of a color precipitant to effect the reaction of said color intermediate and said color precipitant to deposit a coloring material on and in said granules.

2. The process of preparing colored roofing granules which comprises impregnating burned clay granules with a solution of an inorganic color intermediate and treating the impregnated granules with a solution of a color precipitant to effect the reaction of said color intermediate and said color precipitant to deposit a color on said granules, washing the colored granules, and drying the same.

3. The process of preparing colored roofing granules which comprises immersing burned clay granules in a solution of an inorganic color intermediate, removing the excess of the color intermediate from the surface of said granules, boiling said granules with a solution of a color precipitant to effect the precipitation and deposition of a color in and on said granules, washing the colored granules, and drying the same.

POOLE MAYNARD.